United States Patent
Thomas

(10) Patent No.: US 11,662,145 B2
(45) Date of Patent: May 30, 2023

(54) GAS INJECTION SYSTEM, FURNACE PROVIDED WITH SUCH A SYSTEM AND USE THEREOF

(71) Applicant: SOUDOBEAM, Sprimont (BE)

(72) Inventor: Jean-Philippe Thomas, Sprimont (BE)

(73) Assignee: SOUDOBEAM, Sprimont (BE)

( * ) Notice: Subject to any disclaimer, the term of this patent is extended or adjusted under 35 U.S.C. 154(b) by 35 days.

(21) Appl. No.: 17/278,239

(22) PCT Filed: Oct. 24, 2019

(86) PCT No.: PCT/EP2019/079084
§ 371 (c)(1),
(2) Date: Mar. 19, 2021

(87) PCT Pub. No.: WO2020/084076
PCT Pub. Date: Apr. 30, 2020

(65) Prior Publication Data
US 2021/0348847 A1    Nov. 11, 2021

(30) Foreign Application Priority Data

Oct. 25, 2018 (BE) .................................. 2018/5739

(51) Int. Cl.
*F27D 9/00* (2006.01)
*F27B 3/22* (2006.01)
(Continued)

(52) U.S. Cl.
CPC .................. *F27D 9/00* (2013.01); *C21C 5/52* (2013.01); *F27B 3/22* (2013.01); *F27B 3/225* (2013.01);
(Continued)

(58) Field of Classification Search
CPC ... C21C 5/52; F27B 3/22; F27B 3/225; F27D 3/16; F27D 99/0033; F27D 9/00
(Continued)

(56) References Cited

U.S. PATENT DOCUMENTS 5,176,875 A    1/1993  Kanazumi et al.
6,096,261 A *  8/2000  Anderson ............. C21C 5/5217
                                                              266/225

(Continued)

FOREIGN PATENT DOCUMENTS

DE    202007019294 U1    1/2012
DE    102016211477 A1    12/2017
(Continued)

OTHER PUBLICATIONS

International Search Report for PCT/EP2019/079084, dated Nov. 27, 2019.

*Primary Examiner* — Jessee R Roe
*Assistant Examiner* — Michael Aboagye
(74) *Attorney, Agent, or Firm* — Merchant & Gould P.C.

(57) ABSTRACT

A gas injection system includes a tubular wall 3 capable of being thermally stressed and having a proximal extremity and a distal extremity 11, at the distal extremity, at least one extremity opening through which at least one gas is projected. A cooling is system located in the tubular wall including axial channels 12 which extend axially towards the distal extremity and in which a cooling fluid is circulated. Connecting channels 13 circumferentially join the axial channels to each other at the distal extremity of the tubular wall. The connecting channels, which circumferentially join the axial channels at the distal extremity of the tubular wall, have a rounded shape in the direction of the distal extremity.

13 Claims, 4 Drawing Sheets

(51) Int. Cl.
  *F27D 3/16* (2006.01)
  *C21C 5/52* (2006.01)

(52) U.S. Cl.
  CPC .......... *F27D 3/16* (2013.01); *F27D 2003/164* (2013.01); *F27D 2003/166* (2013.01); *F27D 2003/167* (2013.01); *F27D 2009/0013* (2013.01); *F27D 2009/0067* (2013.01)

(58) Field of Classification Search
  USPC ............... 266/46, 241, 265, 270; 373/74, 76
  See application file for complete search history.

(56) References Cited

U.S. PATENT DOCUMENTS

| | | | | |
|---|---|---|---|---|
| 6,372,010 | B1* | 4/2002 | Shver | .................... C21C 5/5217 75/10.46 |
| 8,142,711 | B2* | 3/2012 | Glass | ...................... F27B 3/205 266/241 |
| 9,068,779 | B2* | 6/2015 | Eyfa | ........................ F27D 9/00 |
| 2010/0252968 | A1 | 10/2010 | Glass | |
| 2015/0285502 | A1 | 10/2015 | DiCintio et al. | |

FOREIGN PATENT DOCUMENTS

| | | |
|---|---|---|
| DE | 202017107810 U1 | 1/2018 |
| JP | 2014-196545 A | 10/2014 |
| JP | 2015-161460 A | 9/2015 |
| WO | 2007/100441 A2 | 9/2007 |
| WO | 2011/044676 A1 | 4/2011 |

\* cited by examiner

GAS INJECTION SYSTEM, FURNACE PROVIDED WITH SUCH A SYSTEM AND USE THEREOF

This application is a National Stage of PCT/EP2019/079084, filed Oct. 24, 2019, which claims benefit of Belgium Patent Application No. 2018/5739, filed Oct. 25, 2018, which applications are incorporated herein by reference. To the extent appropriate, a claim of priority is made to each of the above-disclosed applications.

BACKGROUND OF INVENTION

The present invention relates to a gas injection system comprising:
- a tubular wall capable of being thermally stressed and having a proximal extremity and a distal extremity,
- at this distal extremity, at least one extremity opening through which at least one gas is projected, and
- a cooling system located in said tubular wall and comprising axial channels which, between a proximal terminal and a distal terminal, extend axially towards said distal extremity of the tubular wall and in which a cooling fluid is circulated, connecting channels circumferentially joining the aforementioned axial channels to each other at their distal terminal, these connecting channels having a rounded shape in the direction of the distal extremity of the tubular wall.

SUMMARY OF INVENTION

Such gas injection systems are used in particular in the electrical segment of steel production, more particularly in electric furnaces. In an electric arc furnace, each production cycle, called a "casting", comprises four stages: loading the scrap, melting thereof, refining the molten steel and pouring it from the furnace.

The melting stage is mainly concerned with supplying heat as efficiently as possible in view of accelerating the melting of solid scrap. It derives energy for this purpose from 3 sources: the electric arcs developed in the furnace, the flames from burners placed on the walls of the furnace and iron decarburisation and oxidation reactions.

The refining stage gives priority to a chemical oxidation reaction of carbon and other chemical elements by the oxygen supplied. Refining derives its chemical energy from the projection of oxygen at supersonic speed towards the molten metal bath.

Various attachments are necessary depending on the specificities of the process of each steelworks, attachments which, for the most part, are mounted on the side walls of the furnace and blow at an angle towards the bath. Among these attachments are burners, which project a combustible gas and oxygen as an oxidant in such a way as to form a flame. Combination burners are also included, which are not only able to produce a flame, but may also project supersonic oxygen towards the bath.

Burners or combination burners are essential elements of productivity and quality in steelmaking in electric arc furnaces.

As a heat source element, and as a projection element of the refining reaction motor, i.e. oxygen, the burner must be sized specifically for the process used and the converter.

The problem consists as much in ensuring the characteristics and qualities of the burners as in preserving them over time during a period of thousands of castings in order to sustain the different yields of the converter.

Indeed, during the thermo-mechanical cycles induced by the succession of castings, the burner wears out by erosion and cracking as a result of numerous and varied stresses. Thermal stresses are due to radiation from the bath, the flame, the atmosphere, flashback by rebound on the scrap, the proximity of the electric arc and the hot foaming slag covering. Mechanical stresses may also occur, such as expansion and removal cycles, the impact of the scrap and arc flash.

To withstand these stresses, the burner must be cooled with a cooling fluid. The most severely stressed areas are generally the front of the burner facing the interior of the furnace, i.e. its distal extremity, and the interior of the burner or its mixing chamber exposed to the burner flame.

Attempts to remedy these problems are already known.

Examples include burner cooling systems wherein a cooling fluid circulates in coaxial channels arranged peripherally in the external wall of the injector (see WO2007/100441 and US2010/0252968). A cold cooling fluid is injected into the central channel of one of these coaxial channels towards the distal extremity of the injector. There, after heat exchange, it is returned by the coaxial channel which surrounds the central channel, having to perform an abrupt 180° change in the direction of travel. This arrangement results in foaming of the cooling fluid, generally water, at the distal extremity of the coaxial channels, i.e. where cooling should be most efficient. This foam fluid is thermally insulating and should be avoided. Furthermore, due to the coaxial arrangement of the channels, the hot fluid of the return coaxial channel carries out a heat exchange with the fluid passing through the central channel, before it reaches the most thermally stressed area, which is also clearly undesirable.

A burner cooling jacket formed of several longitudinal segments arranged side by side (see U.S. Pat. No. 5,176,875 and DE20 2007 019294 U1) is also known. Two channels wherein a cooling fluid circulates extend axially in each segment of this jacket. These two axial channels are connected by a transverse channel drilled perpendicular to them. The cooling fluid enters by one of the axial channels and exits by the other, being subject to an abrupt change in the direction of travel with thermally insulating foam also forming here. The other disadvantage of this assembly is that the multiple interfaces between longitudinal segments placed side by side are obstacles to uniform propagation of heat within the jacket, reducing its cooling efficiency.

A burner is also known in which the cooling channels end in a cooling die inside the nozzle, all being manufactured by a 3D printing system (see DE 10 2016 211 477 A1). A burner according to this prior art document needs a significant amount of time to be developed, because only one part can be printed in 3D before the next one, which is not industrially feasible. Furthermore, heat transfers are highly penalised because of the lack of compactness of the material and the lower metallurgical quality. Moreover, the surface condition of the burner according to this document is difficult to control.

Lastly, some devices have tubular jackets formed from two sleeves which fit into each other and which are shaped to form axial grooves between them which may possibly connect in a rounded manner (see JP 2015 161460 A and WO 2011/044676). Again, these devices have large junction surfaces which are mechanically fragile and thermally insulating.

The object of this invention is to solve the problems caused by gas injection systems according to the prior art and in particular to increase their lifespan, all while simultaneously ensuring high heat transfer for any flow of cooling fluid.

For this purpose, the invention provides a gas injection system as described in the preamble to this description and wherein the tubular wall is monobloc, said axial channels passing axially through this monobloc tubular wall which has, at the distal terminal of the axial channels, a circumferential groove, the injection system further comprises a closing crown closing the circumferential groove of the monobloc tubular wall, said rounded connecting channels being arranged between said circumferential groove and said closing crown.

Advantageously, said closing crown may be made up of at least two crown elements.

Monobloc tubular wall means that the grooved tubular wall of the injection system according to the invention is one part. The crown provided to close the groove of the tubular wall is thus encompassed in the body of a monobloc tubular wall part.

When the groove is sealed by the closing crown, there is metallic continuity between it and the rest of the tubular wall.

Due to the compact jacket formed by the monobloc tubular wall, continuity of heat conduction is obtained without heat resistance from interfaces, e.g. press-fitted. Temperature distribution is therefore more homogeneous and heat flow is greater. The high-conductivity material forming the monobloc tubular wall, e.g. high-purity copper, allows a large amount of heat from the hot source (the monobloc wall) to be brought quickly to the cold source (the integrated water circuit). This results in high heat transfer to the fluid circuit and therefore a lower and more uniform temperature of the monobloc wall material. This slows down erosion thereof, increasing its lifespan.

Moreover, the monobloc tubular wall according to the invention advantageously makes it possible to substantially reduce the phenomenon of cracking which generally occurs at the junction surfaces of the various components of the extremity of the gas injection system. According to the invention, axial channels, e.g. drilled longitudinally into the tubular wall, require the digging of a small-area circumferential groove and then the closing of this groove with a crown, in order to allow connection between them. The junction surface between the groove and the crown is small; it is located at the periphery of the monobloc tubular wall and is framed by the solid material thereof. Thermal stresses, due to expansion of the body, are mainly radial. They are therefore in the junction plane, whereas it is mainly stresses perpendicular to the junction plane which are capable of causing cracking. Lastly, the junctions are framed by the solid material of the monobloc tubular wall and therefore benefit from additional reinforcement.

Additionally, to ensure efficient cooling of the tubular wall throughout the entire cooling fluid route, it is essential to prevent the phenomenon of cooling fluid foaming, as the foam formed is thermally insulating. This foaming is produced when there are changes in the shape of the cooling fluid route. Due to their rounded shape in the direction of the distal extremity of the tubular wall, the connecting channels of the cooling system according to the invention prevent sudden changes in the direction of travel and also limit pressure losses and instabilities. According to the invention, a rounded shape means a smooth transition between the extremity of two axial channels. This shape allows it to not have to go around rough or sharp edges. It may be easily obtained by shaping the bottom of the circumferential groove, the crown elements used to close the groove or all these components simultaneously.

According to the invention, the distal extremity of the tubular wall means the extremity of the tubular wall of the gas injection system which is opposite to its extremity used for attachment to a furnace or a burner for example, the latter being called the proximal extremity.

Axial channels mean channels which extend parallel to the axis of the tubular wall.

Advantageously, said connecting channels have a circular arc, ellipse or parabola shape. However, these shapes are not limiting.

This particular rounded shape of the connecting channels allows a stable conduction of the fluid, allowing high flow velocities and therefore high Reynolds numbers, without encountering and increasing pressure losses and instabilities, like those caused when there are changes in shape. Thus, it is possible to implement a turbulent flow regime, i.e. with a high Reynolds number, obtained for a high velocity of the fluid flowing through the circuit. This type of flow encourages intense heat exchanges within the fluid and prevents any excessive thickening of the kinetic and thermal boundary layers at the metal/fluid interface. This ensures a high thermal gradient between the cold fluid and the hot metal, encouraging heat extraction thereof. This also prevents a layer of insulating foaming water being created, in contact with the tubular wall, appearing in the event of an increase in temperature.

According to a particular embodiment of the invention, the gas injection system forms a burner injector provided with said monobloc tubular wall in which said cooling system is located. This is particularly the case for burners which form a flame, which are used, for example, when melting scrap.

According to another embodiment of the invention, the gas injection system forms a sheath provided with said monobloc tubular wall in which said cooling system is located. Often, the extremity of a burner must be covered at least partially with a sheath. It may be a separate system from the burner which fits on the extremity of the injector.

According to yet another embodiment of the invention, said sheath is arranged at one extremity of a burner injector, covering it at least partially. The gas injection system then forms a burner-sheath assembly which may be a monobloc system.

Projecting from the extremity of the injector, the sheath forms a mixing chamber where, for example, mixing gases to form a flame may occur, but also where supersonic oxygen may be projected, which is a combination burner.

According to one embodiment of the invention, passage channels circumferentially join axial channels at their proximal extremity.

These passage channels may also have a rounded shape, but in the opposite direction to the distal extremity of the tubular wall.

Advantageously, the monobloc tubular wall has, at said proximal terminal of the axial channels, an additional circumferential groove, the injection system further comprises an additional closing crown formed from at least two crown elements, which seals the additional circumferential groove of the monobloc tubular wall, said passage channels being arranged between said additional circumferential groove and said at least two elements of the additional closing crown.

According to another embodiment of the invention, the monobloc tubular wall is, between said proximal terminal of the axial channels and the proximal extremity of the tubular wall, in the shape of a thinner tip, the injection system further comprises a flange fitted on said tip of the monobloc tubular wall and said passage channels being arranged between said tip and said flange.

These passage channels may easily be obtained by shaping the bottom of the additional circumferential groove, the crown elements used to close the additional groove or all these components simultaneously. When a flange is fitted on a tip of the monobloc tubular wall, the passage channels may be shaped on the tip, in the flange or on both elements simultaneously.

According to a perfected embodiment of the invention, the cooling system consists of at least one cooling coil comprising several axial channels arranged parallel in succession in the tubular wall and joined to each other successively by a connecting channel, then by a passage channel, then again by a connecting channel, and so on. Advantageously, each cooling coil comprises an inlet and an outlet for the cooling fluid arranged in the tubular wall at a distance from the distal extremity thereof. In particular, the cooling system comprises two cooling coils, each covering half of the tubular wall of the gas injection system.

According to a particular embodiment of the invention, said distal extremity of the tubular wall has a more intensely thermally stressed part, and the axial channel or channels supplied directly by said cooling fluid inlet end in this more intensely thermally stressed part.

In this way, the cold inlet cooling fluid is sent directly to the most suitable areas which must be protected the most, while the cooling fluid which has already been heated by heat exchange, flows, prior to exiting, through the axial channels arranged in the less intensely thermally stressed area of the tubular wall.

Advantageously, the axial channels, connecting channels and passage channels have a constant flow cross-section. This constant cross-section of the channels prevents disturbing variations in the flow.

Preferably, said at least one projected gas is chosen from the group consisting of oxygen, supersonic oxygen, air, carbon gases, nitrogen and mixtures thereof, these gases being able to be in the form of a flame following their combustion. Advantageously, the tubular wall is made of copper or copper alloy.

The present invention also relates to a furnace equipped with at least one gas injection system according to the invention.

The invention also relates to the use of at least one gas injection system according to the invention, for processing a metal material in a furnace, in particular for melting scrap, refining steel in an electric furnace or reheating slabs.

BRIEF DESCRIPTION OF THE DRAWINGS

Other details and features of the invention will emerge from the description below, which is not limiting, of an exemplary embodiment of a gas injection system according to the invention, shown in the appended drawings.

The gas injection system shown in the figures is a burner equipped with a sheath. It comprises a tubular injector 1 whose extremity opening is partially covered by a sheath generally referred to as 2. It has a monobloc tubular wall 3 which forms, around the injector, a jacket which, as shown in the figures, is cooled by a cooling system.

DETAILED DESCRIPTION OF THE PREFERRED EMBODIMENTS

Figure 1:
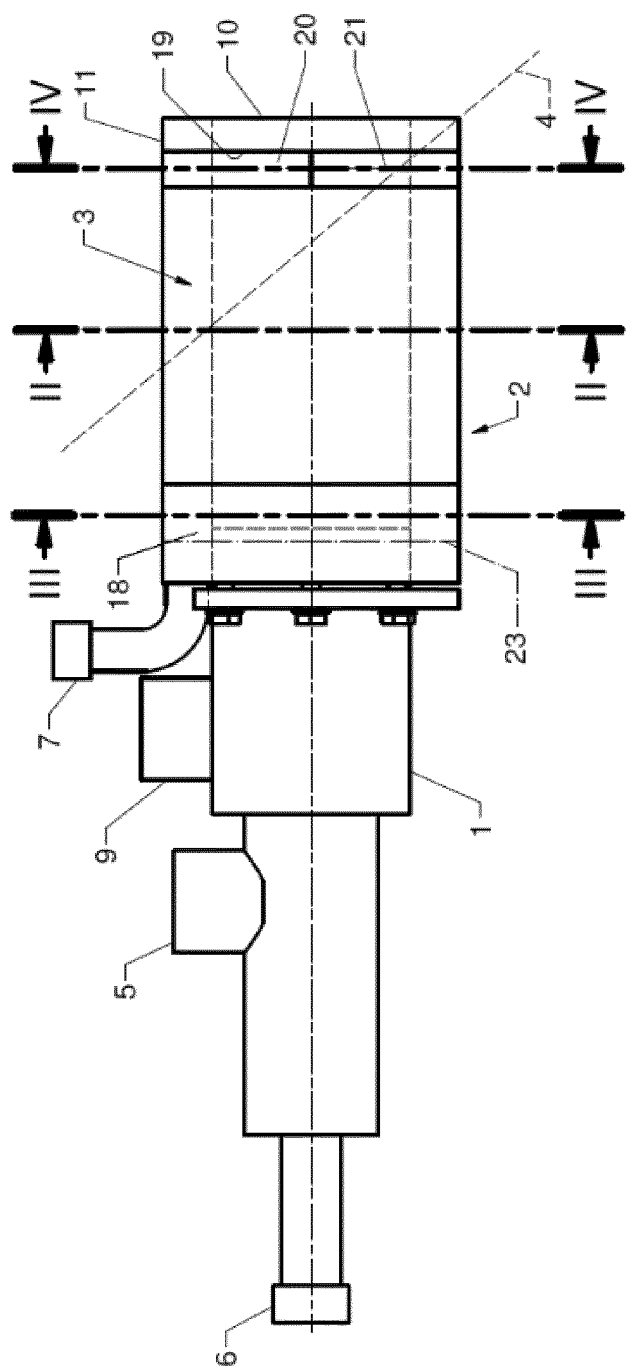
FIG. 1 shows a profile view of a gas injection system according to the invention.

In FIG. 1, the vertical wall of the furnace, on which the burner is attached at an angle, is shown schematically by the dashed line 4.

The burner injector is supplied with fuel, e.g. natural gas, via the inlet 5 and with oxidant, e.g. technical oxygen, via the inlet 9. During operation, a flame is formed in the mixing chamber enclosed by the tubular wall 3 and exits by an opening 10 at the distal extremity 11 thereof. Supersonic oxygen may also be fed into the injector 1 by the supply duct 6.

In the example shown in these figures, the cooling system of the sheath 2 comprises a supply duct 7 for a cooling fluid and an exhaust duct 8 thereof.

Figure 2:
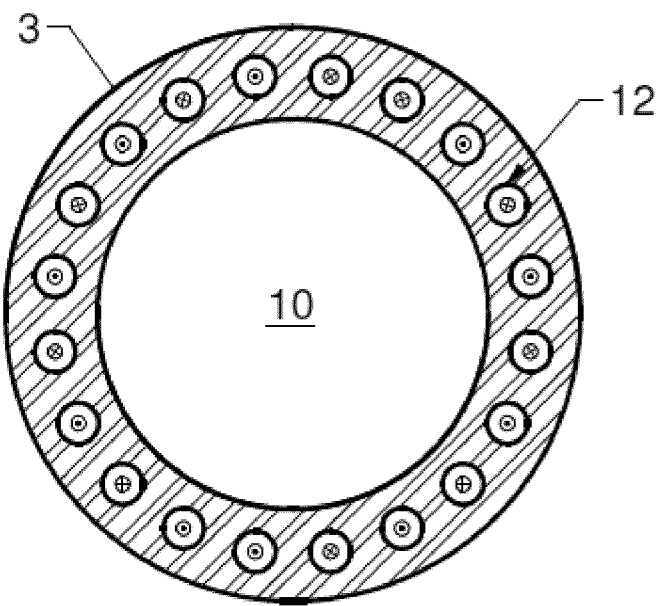
FIG. 2 shows a cross-sectional view along line II-II of the gas injection system of FIG. 1, on an enlarged scale.
Figure 4:
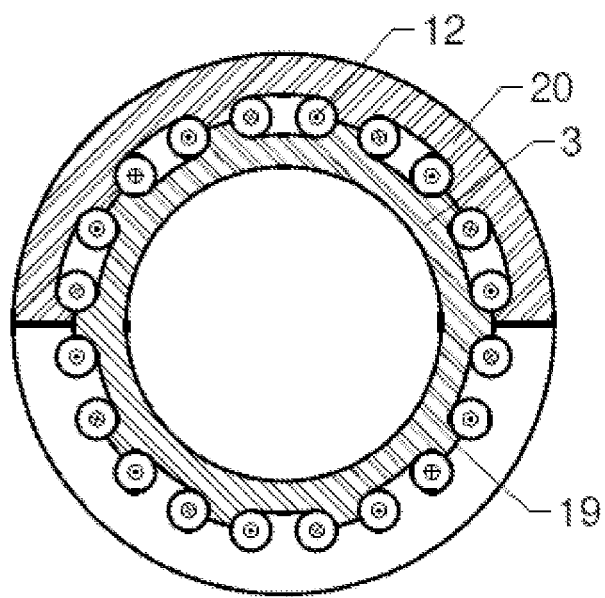
FIG. 4 shows a cross-sectional view along line IV-IV of the gas injection system of FIG. 1, on an enlarged scale and in exploded form.
Figure 4:
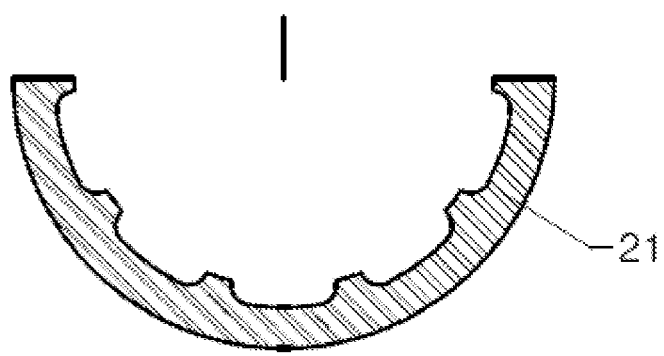
Figure 6:
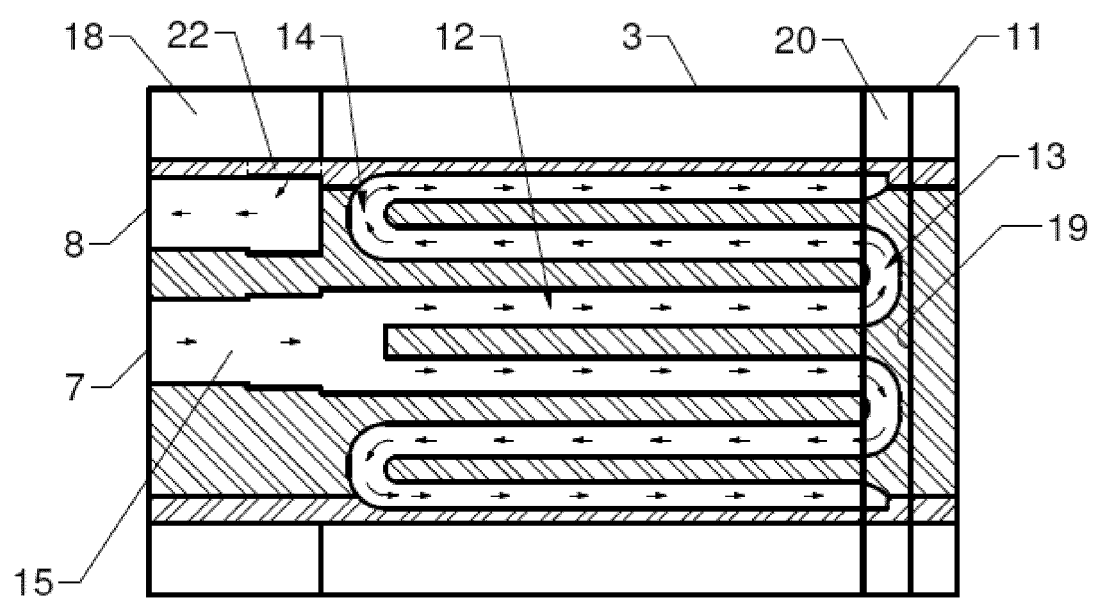
FIG. 6 shows a sectional view along line VI-VI of FIG. 5.

As shown in FIGS. 2, 4 and 6, the cooling system comprises several axial channels 12 which extend axially towards the distal extremity 11 of the tubular wall. The cooling fluid, e.g. water, circulates in these channels, which comes from the supply duct 7 and then flows towards the exhaust duct 8. These channels are drilled into the body of the monobloc tubular wall.

Circumferentially adjacent axial channels are, at the distal extremity 11 of the tubular wall 3, joined by connecting channels 13 which have a rounded shape in the direction of this extremity. In the example shown in FIG. 6, the connecting channels 13 have a rounded shape and thus ensure a smooth transition between the axial channels they join.

At a distance from the distal extremity 11 of the tubular wall, i.e. closer to the wall of the furnace, circumferentially adjacent axial channels are joined by passage channels 14 which have a slightly rounded shape in the opposite direction to the aforementioned distal extremity 11.

In the example shown, the axial channels 12 arranged in succession at the periphery of the tubular wall 3 are joined to each other successively by a rounded connecting channel 13, then by a rounded passage channel 14, then again by a rounded connecting channel 13, and so on, to form at least one cooling coil in the tubular wall 3. Connection between the axial channels is carried out individually, step by step, without requiring co-axial channels which generate foaming, or meetings between several channels.

Figure 3:
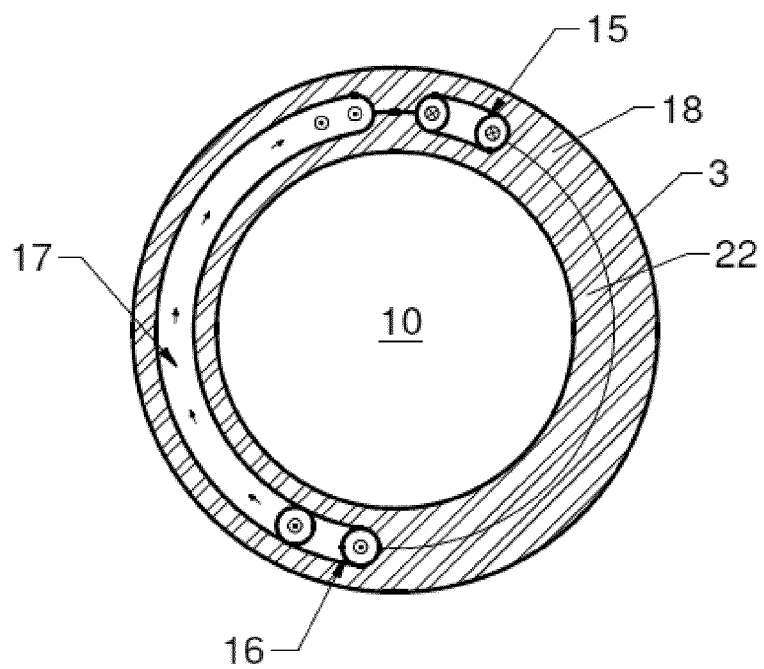
FIG. 3 shows a cross-sectional view along line III-III of the gas injection system of FIG. 1, on an enlarged scale.
Figure 5:
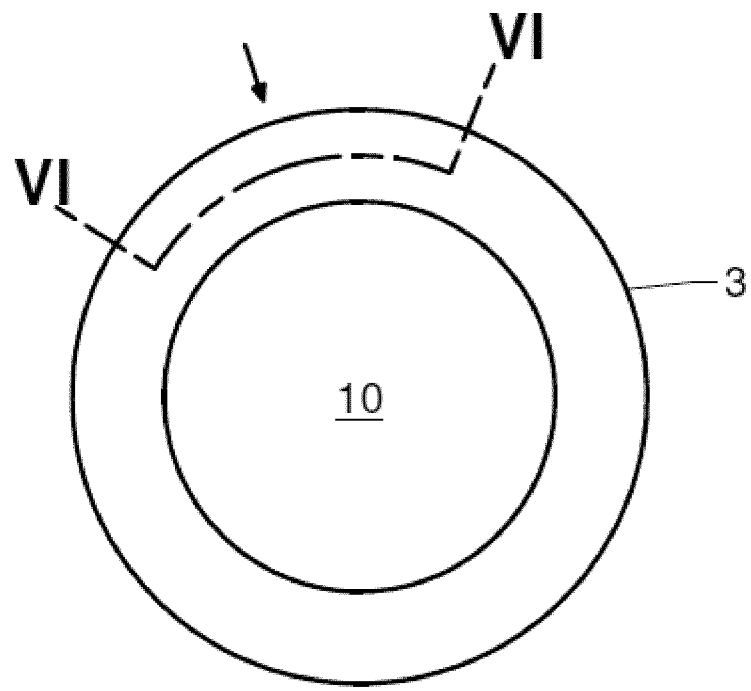
FIG. 5 shows a front view of the extremity of the gas injection system according to FIG. 1, on an enlarged scale.

In the example shown, in particular when referring to FIGS. 3 and 6, it can be seen that the supply duct 7 for the cooling fluid opens opposite the inlet 15 of two axial channels 12 so that two cooling coils each covering half of the tubular wall 3 may be supplied in this way. In FIG. 5, the arrow indicates the location of the supply duct 7 at the back of the tubular wall. The two outlets 16 of these coils open into a peripheral channel 17 which ends opposite the exhaust duct 8 for the cooling fluid. The channels thus form two cooling circuits, divided into separate circumferential areas within the tubular wall. These circuits are supplied by the same fluid source, the duct 7, and end in the same outlet, the duct 8.

As shown in particular in FIGS. 1, 4 and 6, the tubular wall is monobloc and has, in the exemplary embodiment shown, a circumferential groove 19 at the distal terminal of the axial channels 12. This groove is sealed by a closing crown formed, in the example shown, of two half-crowns 20 and 21. The connecting channels 13 are, in the example shown, shaped partly in the bottom of the circumferential groove 19 and partly inside the half-crowns 20 and 21. Naturally, it would also be possible to arrange them only at the bottom of the groove or only inside the half-crowns.

This monobloc arrangement at the extremity of the gas injection system according to the invention, in the most mechanically and thermally stressed part thereof, makes it possible to reduce to a minimum metallic discontinuity and thus to produce an excellent ability to balance the temperature field in the metal alloy used, with rapid transfer of heat from the heat source to the cooling liquid. By radially incorporating the half-crowns 20 and 21 into the circumferential groove 19, i.e. in the solid material of the monobloc tubular wall 3, a highly crack-resistant arrangement is obtained, which simultaneously allows an optimised flow of the fluid in the cooling system.

While the furnace is in operation, the distal extremity 11 of the tubular wall 3 is particularly thermally stressed not only by heat sources from the furnace, e.g. the molten metal bath or the electric arcs, but also by the flame in the burner injector cavity. Due to the angled arrangement of the burner on the refractory wall of the furnace, part of the distal extremity of the tubular wall 3 of the sheath projects further into the furnace and is consequently more particularly thermally stressed.

In the example shown, the supply duct 7 for the cooling fluid is arranged to directly supply two axial channels 12 arranged in this projected part of the tubular wall 3. In this way, the two axial channels 12 each end directly in the most thermally stressed part of the distal extremity of the tubular wall. They form the start of two cooling coils and make it possible to locate the incoming and therefore "cold" cooling fluid at the most stressed points.

As shown in particular in FIGS. 1, 3 and 6, at its proximal extremity, the monobloc tubular wall is in the shape of a thinner tip 22. A flange 18 is fitted on this tip. In the example shown, the passage channels 14, as well as the inlet 15 and outlet 16 leading to the supply duct 7 and exhaust duct 8 are shaped partly on the surface of the tip 22 and partly inside the flange. Naturally, it would also be possible to arrange them only in the flange 18 or only inside the tip 22.

Another arrangement could also be considered, consisting of an additional groove 23 comparable to the groove 19 and a crown formed from two or more crown elements comparable to the half-crowns 20 and 21. The possible location of this additional groove is shown in dash-dot lines in FIG. 1.

It must be understood that the present invention is in no way limited to the embodiment described above and that it may be modified within the scope of the appended claims.

For example, it is possible to have one, three or more cooling coils.

By distributing a free number of cooling circuits, whose channel cross section may be freely sized, it is possible to adjust the fluid velocity for a very wide range of cooling fluid flows and thus a high Reynolds number to which the heat exchange coefficient is directly linked.

The invention claimed is:

1. A gas injection system comprising:
a tubular wall having a proximal extremity and a distal extremity,
the distal extremity, at least one extremity opening through which at least one gas is projected, and
a cooling system located in said tubular wall and comprising axial channels which, between a proximal terminal and a distal terminal, extend axially towards said distal extremity of the tubular wall and in which a cooling fluid is circulated, connecting channels circumferentially joining the axial channels to each other at the distal terminal, the connecting channels having a rounded shape in the direction of the distal extremity of the tubular wall, passage channels circumferentially joining the axial channels having a rounded shape in an opposite direction to the distal extremity of the tubular wall,
wherein said tubular wall is monobloc, wherein said axial channels pass axially through the monobloc tubular wall which has, at the distal terminal of the axial channels, a circumferential groove,
a closing crown closing the circumferential groove of the monobloc tubular wall, wherein said rounded connecting channels are arranged between said circumferential groove and said closing crown.

2. The gas injection system according to claim 1, comprising a burner injector provided with said monobloc tubular wall in which said cooling system is located.

3. The gas injection system according to claim 1, comprising a sheath provided with said monobloc tubular wall in which said cooling system is located.

4. The gas injection system according to claim 3, wherein said sheath is arranged at one extremity of a burner injector, covering the burner injector at least partially.

5. The gas injection system according to claim 1, wherein the monobloc tubular wall, between said proximal terminal of the axial channels and the proximal extremity of the tubular wall comprises a tip, wherein the injection system further comprises a flange fitted on said tip of the monobloc tubular wall and wherein said passage channels are arranged between said tip and said flange.

6. The gas injection system according to claim 1 wherein the monobloc tubular wall has, at said proximal terminal of the axial channels, an additional circumferential groove, wherein the injection system further comprises an additional closing crown, formed from at least two crown elements, which seals the additional circumferential groove of the monobloc tubular wall and said passage channels are arranged between said additional circumferential groove and said additional closing crown.

7. The gas injection system according to claim 1, wherein the cooling system comprises at least one cooling coil comprising a plurality of axial channels arranged parallel in succession in the tubular wall and joined to each other successively by a connecting channel, then by a passage channel in a repeating pattern.

8. The gas injection system according to claim 7, wherein each cooling coil comprises an inlet and an outlet for cooling fluid arranged in the tubular wall at a distance from the distal extremity thereof.

9. The gas injection system according to claim 1, wherein the axial channels, the connecting channels and the passage channels have a substantially constant flow cross-section.

10. The gas injection system according to claim 7, wherein the cooling system comprises two cooling coils each covering half of the tubular wall of the injection system.

11. The gas injection system according to claim 1, wherein said at least one projected gas is chosen from the group consisting of oxygen, supersonic oxygen, air, carbon gases, nitrogen and mixtures thereof, the gases being in the form of a flame following combustion.

12. The gas injection system according to claim 1, wherein said closing crown comprises at least two crown elements.

13. A furnace equipped with at least one gas injection system according to claim 1.

\* \* \* \* \*